Aug. 29, 1933.   A. C. LINDGREN ET AL   1,925,077
CORN PICKER AND HUSKER
Filed Aug. 19, 1930   5 Sheets-Sheet 1
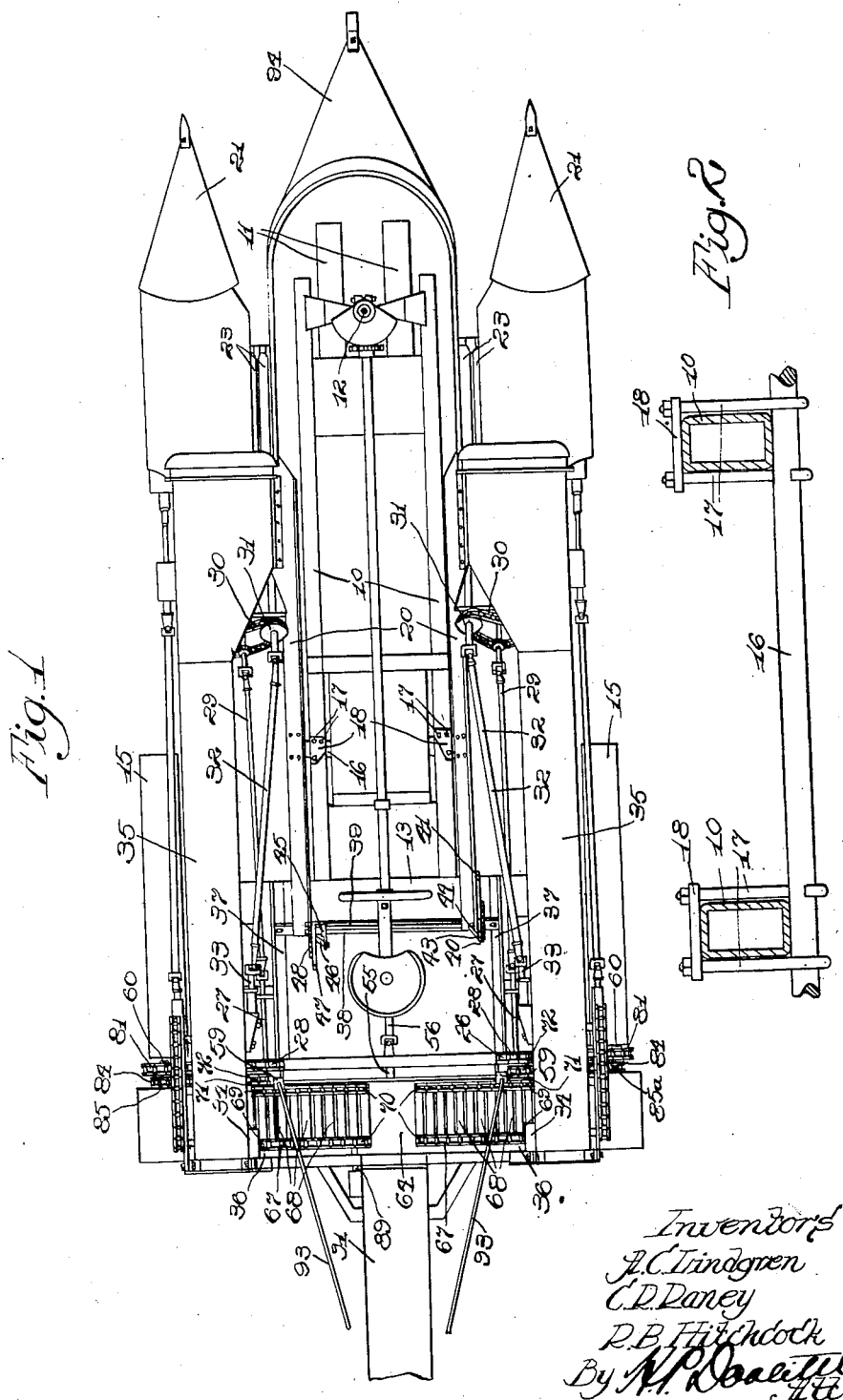

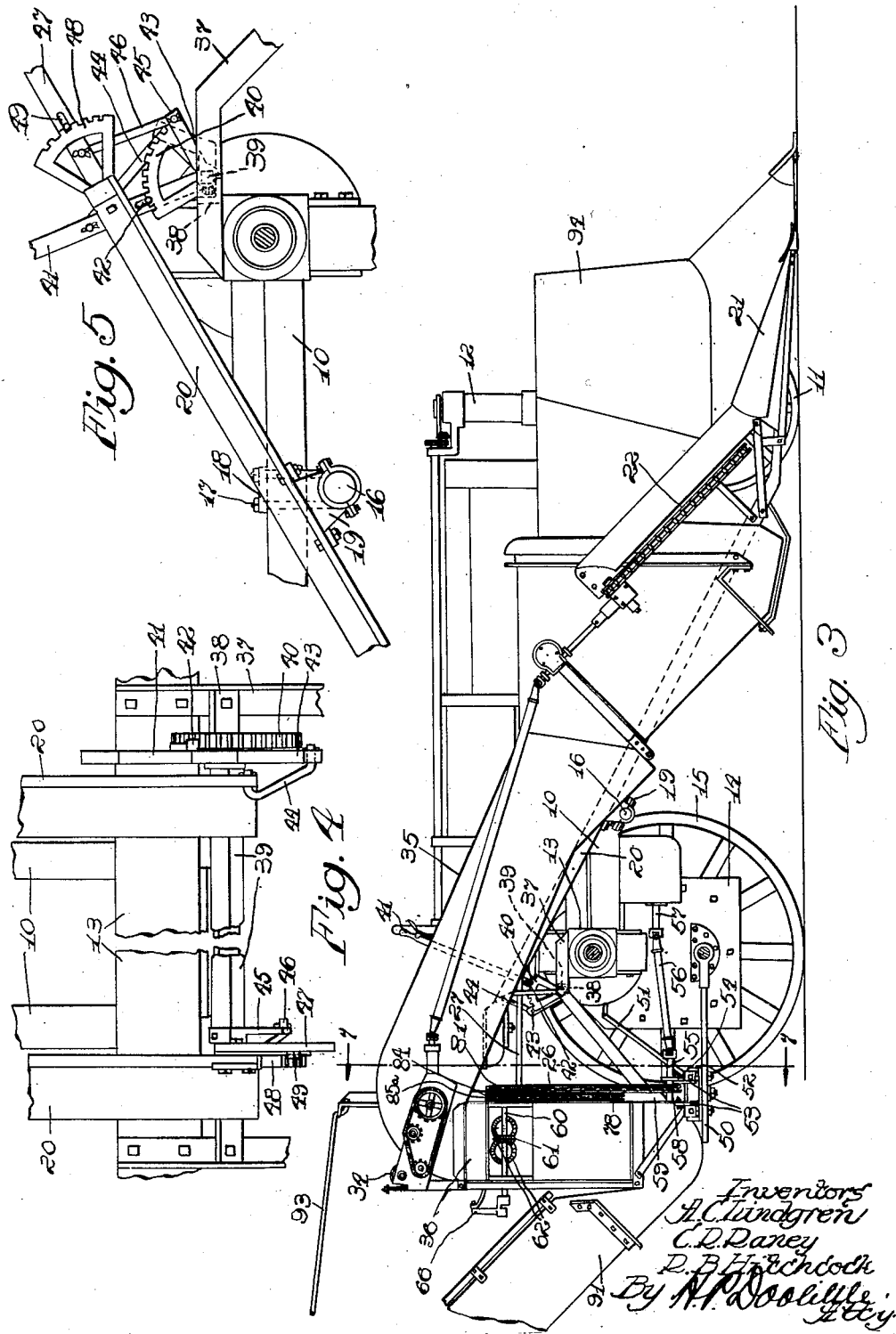

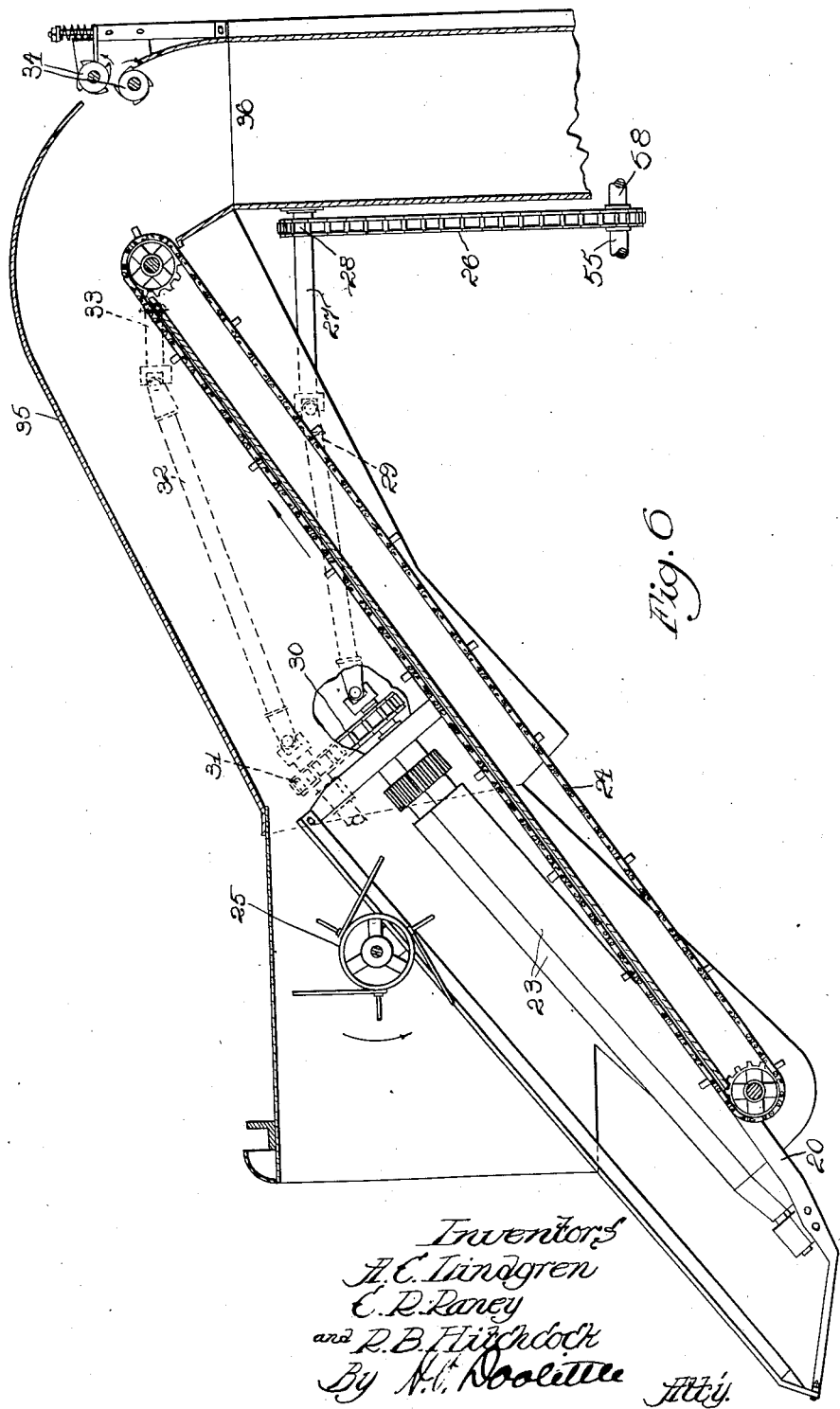

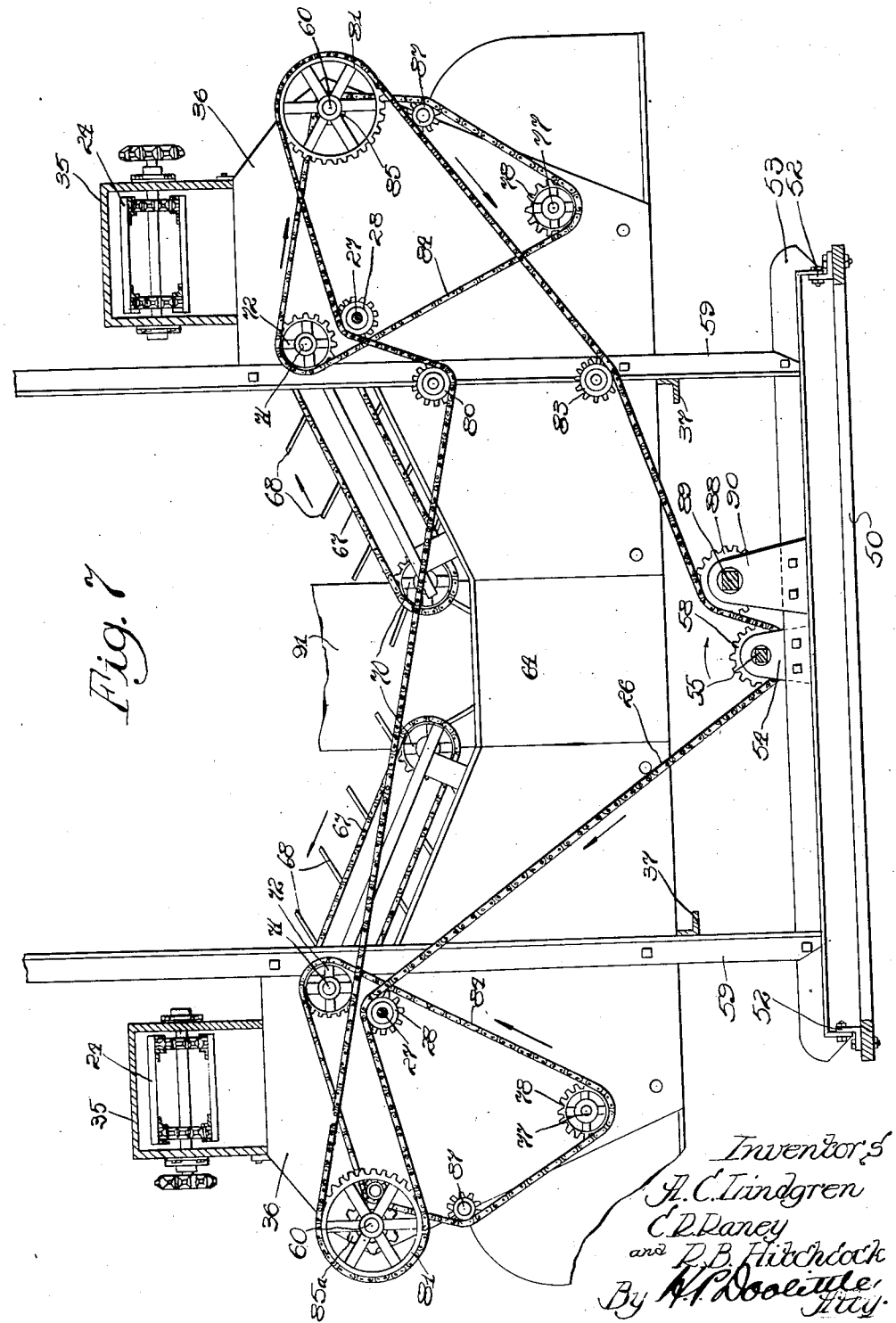

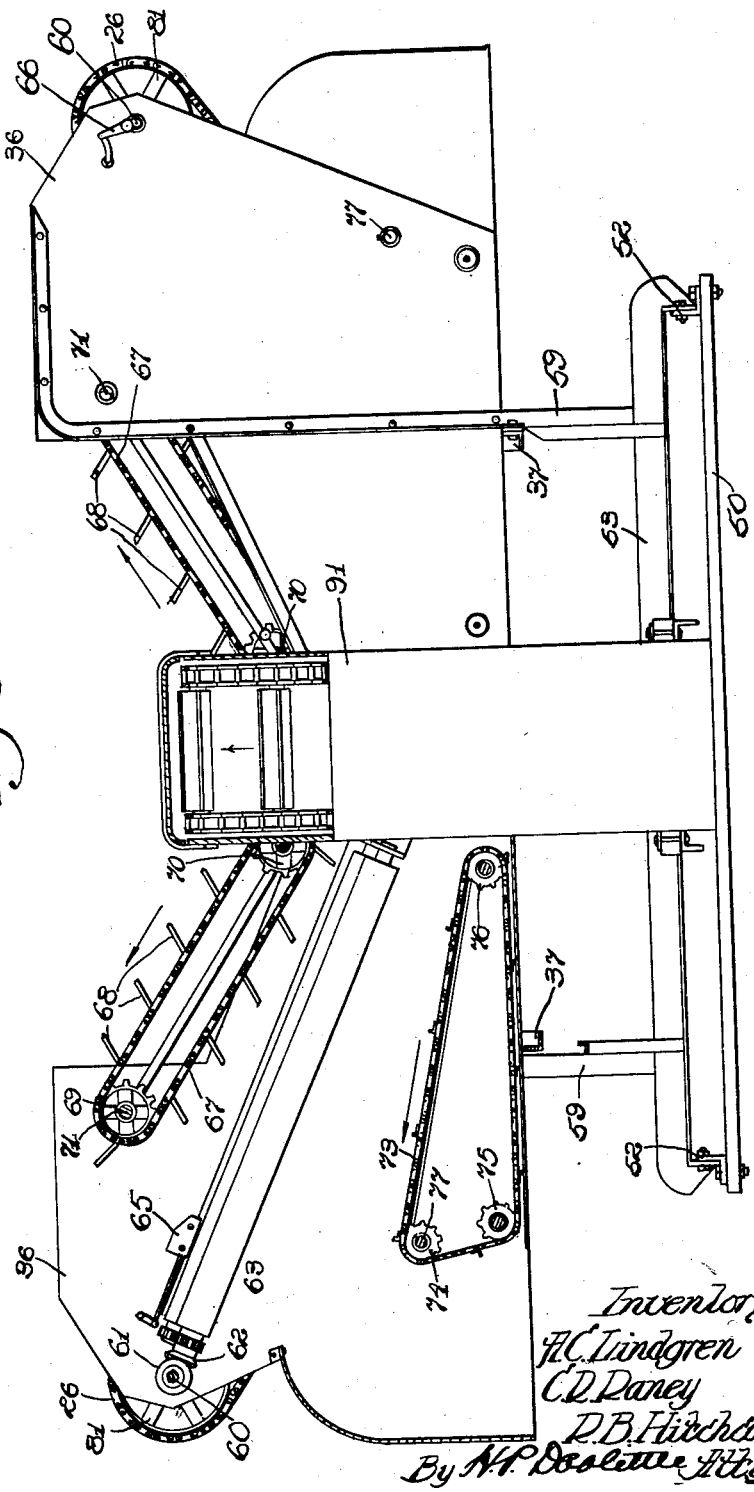

Patented Aug. 29, 1933

1,925,077

UNITED STATES PATENT OFFICE 1,925,077

CORN PICKER AND HUSKER

Alexus C. Lindgren, Chicago, and Clemma R. Raney, Riverside, and Rex B. Hitchcock, Chicago, Ill., assignors to International Harvester Company, a corporation of New Jersey Application August 19, 1930. Serial No. 476,257

9 Claims. (Cl. 56—18)

This invention relates to a corn picker. More specifically it relates to a two-row corn picker adapted to be mounted on and operated by a tractor.

The principal object of the invention is the construction of an improved tractor mounted corn picker of the type above referred to.

Another object is to devise a corn picker particularly suitable for being mounted on and operated by a so-called tricycle type of tractor.

Another object is to construct a corn picker and mount it on a tractor relative thereto in such a manner that two adjacent rows of corn may be picked simultaneously without any part of the tractor and the associated mechanism extending laterally a sufficient distance to break down or run over the rows of corn adjacent to those being picked.

Another object is to provide compact husking mechanisms adapted to receive corn from the picking or snapping mechanisms and deliver it to an elevator located centrally behind the tractor.

Other objects will be apparent from the detailed description to follow.

In the drawings:

Figure 1 is a plan view of the picker of the invention mounted on a tractor, which is a component part of the operative device;

Figure 2 is an enlarged detail showing the mounting of the supporting crossbar on which the snapping mechanisms are mounted;

Figure 3 is a side elevation of the same structure shown in Figure 1 with a section through the axle housing to show that portion of the picker at the rear of the tractor;

Figure 4 is a rear view showing an enlarged detail of the mechanism for tilting the snapping units;

Figure 5 is an enlarged detail showing an elevation of the mechanism for tilting the snapping units;

Figure 6 is a cross sectional view showing one of the snapping units;

Figure 7 is a view taken transversely of the tractor on the line 7—7 of Figure 3, showing the driving means for the husking mechanisms; and, Figure 8 is a rear view, partly in section, showing the husking mechanisms and the elevating means.

The tractor is of a well known tricycle type having side frame members 10. The rolling front support consists of closely spaced wheels 11 mounted on a steerable column 12. The frame members are attached at the rear to an axle housing 13. At the ends of the housing 13 plates 14 are attached and extend downwardly to form a part of a housing, not shown, which contains driving gears for operating the wheels 15. The driving wheels 15 are spaced apart a distance sufficient to straddle two rows of corn planted at the conventional distance apart. The front wheels 11 are spaced close enough together to operate between the two rows of corn straddled by the rear wheels.

The corn picker as mounted on the tractor consists of a plurality of units, more or less independent of each other in both structure and function. A snapping unit is pivotally mounted at each side of the tractor. A divider for lifting the corn stalks is mounted at the front of the tractor. A husking unit consisting of two similar mechanisms discharging centrally is mounted at the rear of the tractor supported primarily by the drawbar. The elevator is also mounted on the drawbar and extends rearwardly for discharging in a wagon or other receptacle drawn behind a tractor.

Transversely of the tractor frame, at a point about even with the rims of the rear wheels, a supporting bar 16 is secured to the frame members 10 by hook bolts 17 and bars 18 through which the bolts extend. The bar 16 extends laterally to each side of the tractor frame and forms a pivot support for bearing blocks 19, rigidly secured to the frames of the snapping units. The snapping units are of a conventional construction in so far as the gathering and snapping mechanisms and the frame structure are concerned. The frame structure is composed of angle bars, such as the bar 20. As the frame structure is not material in this invention, it is not necessary to show and describe it in detail. Each of the snapping units is exactly the same in structure except that they are adapted to operate on opposite sides of the tractor. A gathering means mounted on the picker frame extends forwardly and terminates in a gathering arm 21. Each snapping mechanism is provided with a gathering chain 22, snapping rolls 23, and an endless ear conveyor 24. The beater element 25 positioned at the upper end of the snapping rolls is the subject-matter of a co-pending application Serial No. 435,728 filed March 14, 1930.

A driving chain 26, driven from the tractor power take-off as will hereinafter be described, operates the shaft 27 by means of the chain sprocket 28. From the shaft 27 power is transmitted through the shaft 29 for driving the snapping rolls. Power is also transmitted through the chain 30, the chain sprocket 31, the shafts 32 and 33, and other elements not shown in detail, for driving the conveyor 24.

Through suitable driving chains, sprockets, shafts, and gears, not shown in detail, power is transmitted to the trash rollers 34 and the gathering chains 22. These mechanisms are shown in detail and described in the copending application previously referred to. A housing 35, which encloses the upper portion of the elevator, discharges into a substantially vertically positioned chute 36, which delivers to the husking mechanism.

Figures 4 and 5 show the important details of the mechanism for tilting the snapping units. The angle bars 20, which form parts of the frame structures of the snapping units, extend upwardly and rearwardly over the rear axle housing 13. Angle bars 37, rigidly secured to the axle housing, extend rearwardly and downwardly to form a support for the husking mechanisms. A transverse bar 38 secured to the bars 37 forms a support above which a rockshaft 39 is rotatably secured. At one end, a notched quadrant 40 is rigidly secured to the bar 38. An operating lever 41 secured to the rockshaft 39 is provided with a detent mechanism 42 adapted to engage the notches in the quadrant 40. A lever extension 43 rigid with respect to the lever 41 is connected by a link 44 to the end of one of the bars 20. At the other end of the rockshaft 39, a lever extension 45 is pivotally connected by a link 46 to a lever 47. The lever 47 is pivotally attached at the end of the angle bar 20 at that side of the tractor. A quadrant 48 is rigidly secured to the end of the angle bar 20 and is adapted to be engaged by a detent mechanism 49 mounted on the lever 47.

In the operation of the lifting device, angular movement of the lever 41 rotates the rockshaft 39 and moves the angle bars 20, and thereby the entire snapping unit which is carried on a frame, of which the bar 20 constitutes a part. Any movement of the lever 41 raises or lowers the snapping units an equivalent amount. It is often desirable to raise or lower one unit with respect to the other one. This may be done by operating the lever 47, by which the unit at its side of the tractor may be lowered or raised with respect to the unit at the other side of the tractor.

The drawbar 50 is pivotally attached to the plates 14 and is rigidly held in horizontal position by bars 51. Short angle bars 52 are attached at the sides of the drawbar to form a support for the transversely extending bars 53. A bearing bracket 54 rigidly secured to the center of the bars 53, forms a support for the shaft 55, which is driven by means of a shaft 56 and suitable universal joints from the power take-off shaft 57 of the tractor. A chain sprocket 58 mounted on the shaft 55 provides means for driving the entire snapping and husking mechanism. The upright bars 59 form a part of the frame structure which supports the husking mechanism. As the frame structure and the means for supporting the shafts are conventional in construction, they are described only in so far as is necessary to explain the functioning of the device. As the husking units at opposite sides of the tractor are exactly the same, only one need be described.

A shaft 60, suitably mounted in bearings on the frame structure of the husking unit, is provided with gears 61 for driving the gears 62 mounted at the end of the husking rolls 63. The husking rolls extend downwardly for discharging into the elevator hopper 64. An agitator and ear straightening element 65 is positioned at the upper end of the husking rolls and is adapted to be reciprocated by an eccentric arm 66 mounted on the shaft 60. Above the husking rolls, an ear forwarding device is mounted and adapted to be driven with the portion adjacent the husking rolls moving downwardly. The ear forwarding means consists primarily of an endless conveyor 67 having a series of resilient elements 68 secured thereto. The conveyor is mounted on chain sprockets 69 and 70. The chain sprocket 69 is mounted on a shaft 71 which is driven by the chain sprocket 72, as shown in Figure 7. The particular ear conveying means is the subject-matter of a copending application, Serial No. 445,747, filed April 19, 1930.

Below each set of the husking rolls 63, a husk conveyor and shelled grain separator 73 of a conventional nature is positioned to deliver the husks out of the machine and to deliver the shelled corn into the elevator hopper. The conveyor 73 is mounted on chain sprockets 74, 74, and 76. The sprocket 74 is mounted on a shaft 77, which extends forwardly through the plate housing the husking mechanisms. The shaft 77 is driven by a sprocket 78 shown in Figure 7.

In Figure 7, the main chain 26, which drives all of the mechanism of the corn picker, is shown in full extending over all of the chain sprockets to which power is transmitted. The chain 26 is rotated in the direction indicated by the arrows. It extends around the idler sprocket 80, around the chain sprockets 81, which are mounted on and drive the shafts 60, over the chain sprockets 28, and around the idler sprocket 83. The sprocket 83 is mounted for vertical adjustment whereby the chain may be tightened. Chains 84 extend over the chain sprockets 72, which drive the ear forwarding means, around the chain sprockets 78 which are mounted on and drive the shafts 77, and over the idler sprockets 87. As shown in Figure 7, the chain 84 on the right hand side extends around the small sprocket 85 on the shaft 60. On the other side, the chain 84 is held in contact with the sprocket 85ª by an idler pulley in order that the chain will be rotated in the proper direction. A chain sprocket 88 mounted on a shaft 89 supported by a bracket 90 provides means, not shown in detail, for driving the elevator. The elevator consists essentially of a rearwardly and upwardly extending shaft 91, which is supported at the bottom on the drawbar 50. The lower end of the elevator is positioned beneath the hopper 64 into which the husked ears of corn and the shelled corn are delivered.

The upright bars 59, which are a part of the frame of the husking mechanism form means for attaching rods 93, which extend rearwardly to the elevator shaft and support the same. A wagon or other suitable receptacle may be attached to the drawbar of the tractor and drawn therebehind for receiving grain from the elevator.

A divider 94 mounted around the front of the tractor is adapted to lift the stalks of corn and deliver them into the gathering mechanism of the snapping units.

The divider 94 is of a somewhat flexible construction and is loosely pivoted on the two snapping units at the sides of the tractor. This construction permits a limited tilting movement of the two snapping units relative to each other for adjustment within the necessary range of movement.

From the description of this device, its operation is easily understood. Ears of corn removed by the snapping mechanisms are delivered by the conveyors 24 into the husking mechanisms. From the husking mechanisms, the corn is delivered into the elevator hopper 64, and thence up the elevator shaft 91.

It is to be understood that applicant has shown only a preferred form of his improved corn picker and that he claims as his invention any modifications thereof falling within the scope of the appended claims.

What is claimed as new is:

1. A corn picker comprising a tractor having a rearwardly extended drawbar, corn gathering mechanisms mounted on each side of the tractor adapted to gather corn from adjacent rows, conveying means mounted at each side of the tractor positioned to receive corn from the gathering means and deliver it rearwardly, husking means mounted at the rear of the tractor on the drawbar and positioned to receive corn from the respective conveying means, and an elevator carried on the drawbar and positioned to receive corn from the husking means.

2. A corn picker comprising a tractor having rear wheels adapted to run on the outside of adjacent rows of corn, a front rolling support adapted to run between said rows, corn gathering and snapping mechanisms pivotally mounted on each side of the tractor and adapted to gather the corn from said adjacent rows, conveying means mounted at each side of the tractor and positioned to receive corn from the gathering means and deliver it rearwardly, a drawbar extending rearwardly behind said tractor, husking means rigidly mounted on said drawbar and positioned to receive corn from the respective conveying means, and an elevator carried by said drawbar positioned to receive corn from the husking means.

3. A corn picker comprising a tractor having a transversely extending rear axle housing, a frame structure secured to said housing and extending rearwardly therefrom, corn gathering mechanisms mounted on each side of the tractor adapted to gather corn from adjacent rows, conveying means mounted at each side of the tractor positioned to receive corn from the gathering means and deliver it rearwardly, husking means mounted at the rear of the tractor on the frame structure and positioned to receive corn from the respective conveying means, and an elevator secured to the frame structure and positioned to receive corn from the husking means.

4. A tractor mounted corn picker comprising, in combination with a tractor having a transversely extending rear axle housing, a corn gathering unit mounted on each side of the tractor forwardly of said housing, said units being positioned to gather corn from adjacent rows, a conveying means mounted at each side of the tractor positioned to receive corn from the respective gathering units and deliver it rearwardly, a frame structure mounted on the rear axle housing, husking means mounted at each side of said frame structure and positioned to receive corn from the conveying means and to deliver the husked ears centrally of the tractor, and a rearwardly extending elevator mounted on the frame structure in position to receive the husked ears from the husking means.

5. A tractor mounted corn picker comprising, in combination with a tractor having a transversely extending rear axle housing, a corn gathering mechanism mounted on each side of the tractor forwardly of said housing positioned to gather corn from adjacent rows, a conveying means mounted at each side of the tractor positioned to receive corn from the respective gathering mechanism and deliver it rearwardly, a frame structure mounted on the rear axle housing and extending below said housing and rearwardly therefrom, husking means mounted at each side of said frame structure and positioned to receive corn from the gathering means and to deliver the husked ears centrally of the tractor, and a rearwardly extending elevator mounted on the frame structure positioned to receive corn from the husking means.

6. A tractor mounted corn picker comprising, in combination with a tractor having an arched rear axle housing, a corn snapping unit mounted at each side of the tractor, said units being positioned to gather corn from adjacent rows, a conveyor mounted at each side of the tractor positioned to receive corn from a snapping unit and extending upwardly rearwardly over the arched axle housing, a frame structure secured to the arched axle housing and extending below said housing and rearwardly therefrom, a husking unit mounted on said frame structure, said unit consisting of two transversely extending, downwardly inclined sets of husking rolls, the upper end of each set of rolls being positioned to receive corn from one of the conveyors, and an elevator mounted on the frame structure in position to receive husked corn from the husking unit, said elevator extending rearwardly upwardly to wagon height.

7. A corn picker comprising a tractor having a transversely extending rear axle housing, a frame structure secured to said housing and extending rearwardly therefrom, corn gathering mechanisms mounted on each side of the tractor adapted to gather corn from adjacent rows, conveying means mounted at each side of the tractor positioned to receive corn from the gathering means and deliver it rearwardly, husking means mounted at the rear of the tractor on the frame structure and positioned to receive corn from the respective conveying means, and means secured to the frame structure and positioned to receive corn from the husking means.

8. A tractor mounted corn picker comprising, in combination with a tractor having a transversely extending rear axle housing, a corn gathering unit mounted on each side of the tractor forwardly of said housing, said units being positioned to gather corn from adjacent rows, a conveying means mounted at each side of the tractor positioned to receive corn from the respective gathering units and deliver it rearwardly, a frame structure mounted on the rear axle housing, husking means mounted at each side of said frame structure and positioned to receive corn from the conveying means and to deliver the husked ears centrally of the tractor, and means on the frame structure in position to receive the husked ears from the husking means.

9. A tractor mounted corn picker comprising, in combination with a tractor having an arched rear axle housing, a corn snapping unit mounted at each side of the tractor, said units being positioned to gather corn from adjacent rows, a conveyor mounted at each side of the tractor positioned to receive corn from a snapping unit and extending upwardly rearwardly over the arched axle housing, a frame structure secured to the arched axle housing and extending rearwardly therefrom, a husking unit mounted on said frame structure, said unit consisting of two transversely extending downwardly inclined sets of husking rolls, the upper end of each set of rolls being positioned to receive corn from one of the conveyors, and means mounted on the frame structure in position to receive husked corn from the husking unit.

ALEXUS C. LINDGREN.
CLEMMA R. RANEY.
REX B. HITCHCOCK.